Patented Aug. 19, 1930

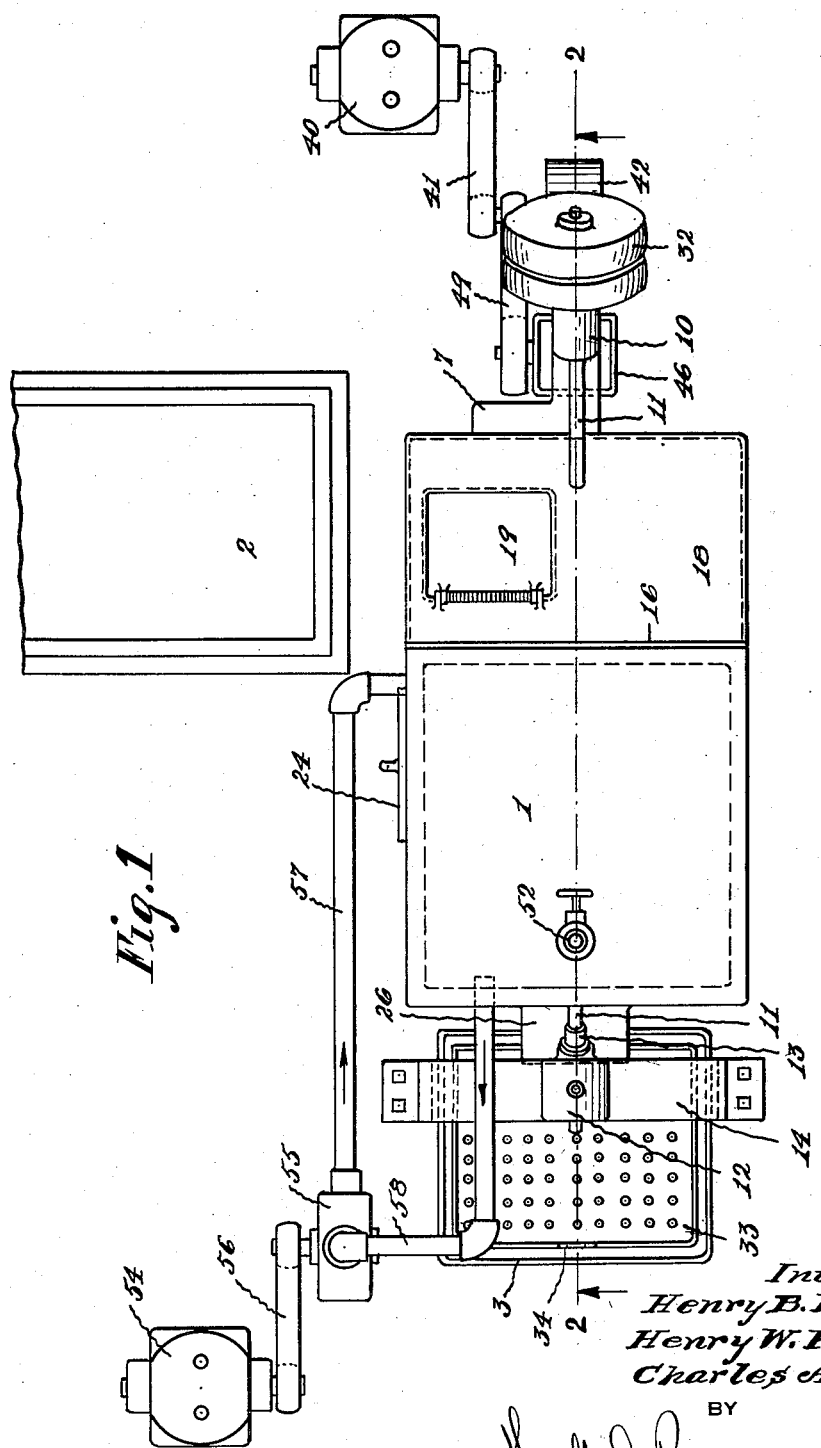

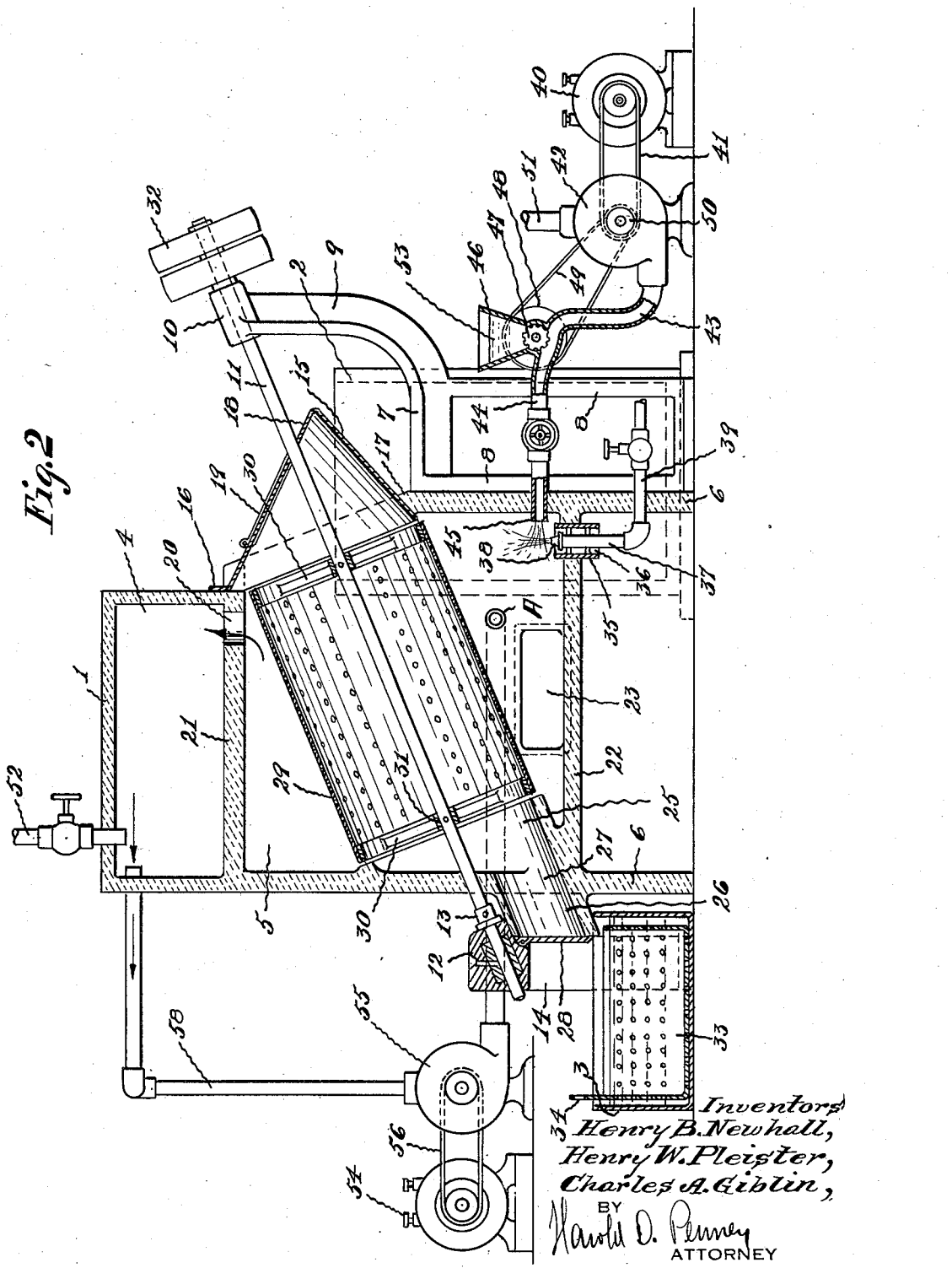

1,773,495

UNITED STATES PATENT OFFICE

HENRY B. NEWHALL, HENRY W. PLEISTER, AND CHARLES A. GIBLIN, OF GARWOOD, NEW JERSEY, ASSIGNORS TO HENRY B. NEWHALL CORPORATION, OF GARWOOD, NEW JERSEY, A CORPORATION OF NEW JERSEY

PROCESS AND APPARATUS FOR TREATING GALVANIZED ARTICLES

Application filed August 21, 1928. Serial No. 301,122.

The present invention relates to galvanizing processes and apparatus, and has particular reference to a method of, and apparatus for, treatment of hot-dipped galvanized articles.

One of the main objects of this invention is to provide a method of cleaning hot-dipped galvanized articles in a non-oxidizing, neutral or reducing atmosphere while the coating is in fluid condition, in such a manner that a maximum surface of the coated articles is exposed to a constantly changing non-oxidizing gaseous atmosphere in a closed chamber, with the resultant advantages in economy of operation, brightness of finish and perfection in coating, in contrast to old methods of subjecting hot galvanized articles to solid substances, such as sal-ammoniac in an open trough.

Another important object of the invention is to provide a cleaning process for galvanized articles after being hot-dipped, in which process hot-dipped articles are passed into a rotating screen, while being kept at a temperature which maintains the coating in fluid condition, the latter being enclosed in a heated chamber, the interior of which is provided with a continuously-circulating, heated, non-oxidizing, neutral or reducing gas.

Another important object of the invention is to provide an apparatus for cleaning hot-dipped galvanized objects which includes a closed chamber, an inclined rotating screen adapted to receive and feed the objects therethrough by gravity, the chamber having means associated therewith to constantly create and feed a non-oxidizing gas into the chamber, and another means adapted to withdraw such gas from the chamber for reintroduction into the chamber.

Still another object of this invention is to provide a method of galvanizing, in which articles after being hot-dipped in a zinc pot are subjected, while passing through a rotating screen enclosed in a closed chamber, to a non-oxidizing, neutral or reducing substance in a gaseous state, the gas being formed from dust blown into a hot zone, and being constantly circulated through the confining chamber during the passage of the articles therethrough.

And still other objects of the invention are to improve generally the simplicity and efficiency of such devices and to provide a device or apparatus of this kind which is economical, durable and reliable in operation, and economical to manufacture.

The inventive features for the accomplishment of these and other objects are shown herein in connection with an improved method and apparatus for treating hot-dipped galvanized objects which, briefly stated, includes in combination, a heating chamber, partition means therein provided with an aperture dividing said chamber into upper and lower compartments, a drum member in the lower compartment, the drum being open at both ends and having perforated walls, the axis of the drum being disposed at an angle to the vertical axis of the chamber, a shaft passing through said drum and chamber and operatively affixed to the drum, means at one end of the shaft to drive the shaft and drum, a blower mechanism having a nozzle associated with the chamber, said nozzle being disposed in the lower compartment, a feed device operatively associated with said blower and delivering a non-oxidizing, neutral or reducing substance to said nozzle, a burner associated with said lower compartment adapted to vaporize such a substance, a normally closed inlet hopper associated with said lower compartment and drum and adapted to have hot-dipped objects placed therein for movement into said drum, said lower compartment being provided with an outlet member having a peripheral portion registering with an end of said drum, said outlet being provided with an openable, normally closed member, a cooling trough associated with said outlet and adapted to receive and chill articles passing from said drum into said outlet to set the coating thereon, a second blower, conduit means associated with said second blower and said upper and lower compartment to circulate gas from one compartment to the other through said partition aperture, a second conduit means associated with the first and said upper compartment to said feed device, whereby the non-oxidizing, neutral, or reducing gas may be passed through said conduit and thus be used as a conveying medium for additional substance being conveyed to said nozzle.

Many of the features of this invention may be used without employing all of them, as some of those which are not essential may be omitted without departing from the spirit of the invention, though such omission may to a greater or less extent affect the quality of the product. Moreover the device is capable of receiving various mechanical expressions, other than herein disclosed, without departing from the spirit of the invention itself.

For the purpose of describing the invention, there is illustrated in the accompanying drawings one preferred form of apparatus, in which drawings Fig. 1 is a plan view of the entire apparatus, and Fig. 2 is a sectional view taken on the line 2—2, Fig. 1, looking in the direction of the arrows.

Referring to the accompanying drawing, in which like characters of reference indicate the same parts in the different views, our device comprises a treating chamber, denoted generally by the numeral 1, disposed adjacent a conventional galvanizing pot or kettle 2 at one end, and a water cooling trough 3, at the opposite end.

The articles to be galvanized are placed in the pot 2 for the required length of time, and then conveyed to the chamber 1. The latter comprises, essentially, an upper and lower compartment 4 and 5 respectively, and which may be made of fire-brick or other heat resisting material.

A pair of supports 6, also made of fire brick, support the structure. A bearing bracket 7 is mounted at one end of the chamber 1, and is supported by uprights 8 integral therewith. One of these uprights is partly secured to a wall of the compartment 5 and partly to one of the supports 6. The bracket 7 has an upstanding portion 9, offset thereto, the end of which is formed as an inclined shaft bearing 10.

An inclined shaft 11 is rotatably supported in bearing 10, at one end thereof, and its other lower end by a thrust bearing 12, which adjoins the chamber 1 on the opposite or discharge end thereof. The shaft 11 pierces the wall of compartment 5 before it reaches the bearing 12, and is retained by a thrust collar 13 in proper relative position. A bearing base 14, bolted to the floor, supports the bearing 12 and opposes the thrust of the shaft 11 and its load.

Returning to the end of compartment 5 nearest the zinc pot 2, it will be observed that the wall of compartment 5 subjoining the similar end wall of compartment 4 is offset therefrom. A V-shaped hopper 15, the apex pointing in the direction of the inclined shaft 11, has one end thereof affixed, as at 16, to a wall of compartment 4, and the other end affixed to the peripheral surface of an aperture formed in the offset wall of compartment 5, as at 17.

The hopper 15, on its top or cover portion 18, is provided with a spring-hinged swinging lid 19 through which the galvanized material from pot 2, is passed for treatment within the chamber 1. The cover 19 is normally spring pressed in closed position to prevent fumes from escaping from the chamber 5, but opens easily downward to permit entry of the articles being treated, and automatically closes.

The compartment 4 is completely enclosed by fire brick and connects to compartment 5 through an aperture, or apertures, 20 in horizontal partition 21. A floor member 22 forms the lower portion of compartment 5. The rear side wall of compartment 5, adjoining the member 22, has a flush cleaning hand-hole 23 formed therein, which is normally closed by a cover 24, and is readily opened for insertion of a cleaning device to remove excess spelter from the member 22.

The wall of compartment 5 adjoining the bearing 12 has projecting therefrom and into the interior of the compartment 5, a cylindrical drum coacting discharge chamber 25, the vertical axis of which is inclined, and coincides with the inclination of shaft 11. A second cylindrical discharge chamber 26, having a smaller diameter than the first portion, is offset therefrom, and is connected thereto at a point 27 in the compartment end wall, projects from the chamber, outwardly therefrom. The axis of inclination of chamber 26 is parallel to, but offset of chamber 25. Thus, the lower walls of these chambers 25, 26 form one continuous gravity inclined discharge duct, one end of which lies within the chamber and the other end projects towards and over the chilling trough 3.

As shown in Fig. 2, the discharge end of chamber 26 has a top edge abutting the lowermost portion of bearing 12 and is normally closed by a self-closing hinged closure plate 28.

A rotatable, perforated cylindrical drum or screen 29 is fixedly mounted to shaft 11 and parallel thereto. The ends of the drum, which are open, have spaced spider members 30 therein, which radiate from hubs 31 rigidly secured to the shaft 11. The upper end of screen 29 registers with the ends 17 and 16 of the inlet hopper 15, while the lower end registers with the top peripheral edge of cylindrical chamber 25. Thus, material dumped through the lid 19 into the hopper, passes into the drum screen 29 which is caused to be rotated, and passes therethrough and out of the chamber through the cylindrical discharge means 25, 26. As the articles are rotated and pass towards the discharge 26, they force the closure disk 28 to open, and then fall into water cooling trough 3 so disposed between the legs of base 14, that the lowermost edge of outlet 26 projects thereover.

To permit quick and convenient removal of the treated material from the tank 3 there is provided a basket 33 which is set in said trough, whereby the treated material falling into the trough 3 lodges in said basket. The basket is provided with a handle or handles 34 to permit manual removal of basket and load.

An open ended air admitting cylinder 35 is affixed in the floor 22, one end opening into the compartment 5, the other end into the air space between the supports 6. An oil burner nozzle 37 is supported within the air cylinder 35 by spiders 36, so that the jet nozzle 38 thereof projects somewhat beyond the open end of the cylinder 35. The burner is connected to a source of fuel supply, not shown, of gas or oil by means of a valved pipe line 39. The gas or oil maintains a temperature within the chamber 5 of about 750° to 1000° F. or more, thus tending to maintain the coating on the introduced articles at the desired fluid condition until discharged therefrom. The feed mechanism for the non-oxidizing, neutral or reducing material will now be described. A motor 40, through belting 41, drives a small blower 42. A conduit 43 is connected at one end to the blower outlet and has its other end connected to a valved tuyère 44, which projects as at 45, into the interior of chamber 5, the open end thereof being adjacent the burner 38 and spaced therefrom and slightly above it. The tuyère 44 may be supported between the bearing uprights 8.

A feeding hopper 46, as shown in Fig. 1, and mounted to carry and supply a gasifiable material 53 into duct 43, is affixed to the upper horizontal portion of the conduit 43, and is disposed beneath the bracket member 9. A rotatable feeding disk 47, having a serrated or corrugated feeding periphery, is disposed in the portion of the hopper 46 that adjoins the conduit 43 and connects thereto. The disk has connected thereto a driving pulley 48 driven by a belt 49 from a pulley 50, mounted on the blower 42. A conduit 51, affixed at one end to the blower 42, connects to the valved conduit 52, which projects into the interior of compartment 4, the conduit portion between 51 and 52 being omitted for simplicity of showing.

Thus, the blower 42 when being driven from the motor 40 serves to blow material 53 fed from the hopper 46 into the conduit 43, through the tuyère and nozzle 45 in pulverulent condition. When the material reaches the flame issuing from the burner nozzle it is immediately gasified.

The motor 40 simultaneously drives the pulley 48 of the feed disk, and thus permits the feed disk 47 to break up and feed the gasifiable material 53 to the conduit, as fast as the blower blasts it away.

The material 53 in the hopper 46 may be any substance that are non-oxidizing relative to the zinc coating on the objects passing into the screen 29. Such substances may be sal-ammoniac, zinc ammonium chloride, boric acid, and other similarly acting compounds which gasify readily under influence of heat. The sal-ammoniac, or other substance, should be placed in the hopper 46 in a powdered state, thereby facilitating its feeding by the disk 47 and its gasification by heat in compartment 5.

Again, the material 53 may be sulfur dust. We have found that sulfur gas may be used satisfactorily as a non-oxidizing agent. This may be attributed to its reducing action on any free or combined oxygen present in the article chamber.

It may be also stated that fumes or gases of a neutral, non-oxidizing or reducing nature may be projected directly into the compartment 5 through the tuyère 45 from a gas tank containing such fumes or gases. For example, sulfur gas or sulfur dioxide may be injected into the tuyère 45 from pressure tanks containing the same.

A second motor 54 disposed on the trough side of the chamber 1, drives a blower 55 through belting 56. A conduit 57 leads from the output side blower to a point A in the compartment 5 adjacent the cover 24. This conduit projects into the interior of the compartment and serves as a delivery pipe for gas taken from chamber 4 and passed by the blower 55 to the compartment 5. A second conduit 58, connected to the intake side of the blower 55 taps the rear wall of compartment 4 and projects therein. Thus, due to the action of the blower 55, gas is withdrawn from compartments 5 and 4 into the conduit 58 in the direction of the arrows and then discharged through the conduit 57 into compartment 5, in the direction of the arrow.

This arrangement may be used when the arrangement 40—42—45—46 is temporarily shut down, upon suitable density of the gas in chamber 5 being reached.

In operation, the objects to be galvanized are placed in the pot 2, and after a predetermined immersion period for coating therein, are removed. The lid 19 of the chamber hopper 15 is then forced down and the hot-dipped objects dumped into the chamber. The lid 19 then closes, sealing the chamber, retaining the gas and desired temperature therein.

The fast pulley 32 is rotated by power (not shown) and thus rotates the shaft 11 and drum 29 at rapid speed. Due to the inclination of the drum hopper 15 the objects dumped therein pass down into the inclined perforated drum 29.

As the objects pass to and through the drum they are caught up and rapidly whirled, thus facilitating the removal of excess spelter thrown off their surfaces by centrifugal action and impact with the sides of the drum, during which period they pass to and out of discharge port or chamber 28 to the basket 33.

Operation of the motors 40, 54 actuates blowers 42, 55. Blower 42 withdraws, at the start, air from compartment 4 and blows it through conduit 43. The feed disk 47, operating with blower 42, controls the passage of powdered material into the conduit, and thus permits the stream of fluid created by blower 42 to convey the powdered material to tuyère 44 and nozzle 45.

As the stream of powdered material issues from nozzle 45, it passes into the hot zone of the flame from the burner nozzle 38, and is gasified. The action of both blowers 42, 55 draws the gasified material upwards through perforations of drum 29, and throughout the entire compartment 5 and fills it with a non-oxidizing, neutral or reducing atmosphere, as desired.

The gas is then drawn through the aperture 20 into the compartment 4. Some of the gas is withdrawn into the conduit 58 and back through the conduit 57 into compartment 5 to be used over again. The remainder is drawn into the conduits 52, 51 to be passed into conduit 43, to carry additional powdered material into the tuyère 44.

The excess spelter from the objects passes through the drum perforations and is mainly deposited on the floor member 22, from which it may be removed through the closable handhole 23. When the objects pass out of the drum, they slide through discharge means 25, 26. The inclination of these discharge means serves to facilitate the movement of the objects towards and into the cooling trough 3.

It will be understood that the motor 54 and blower 55 may be dispensed with, and the blower 42 perform their allotted functions.

Again, the action may be rendered practically continuous and with relatively few interruptions by the apparatus described above, wherein the gas is being constantly formed and re-circulated. When a great excess of gas is present, some of it may be easily discharged to atmosphere through valved discharge pipe 52.

It will, thus, be seen that our method involves the subjection of individual zinc coated articles, due to the rotation of member 29, to an atmosphere that may be non-oxidizing, neutral or reducing, as desired, whereby smooth, uniform, galvanizing is effected.

The foregoing detailed description has been given for clearness of understanding. Hense, no unnecessary limitations should be understood. Further, the appended claims should be construed as broadly as permissible in view of the prior art, since many and various changes may be made without departing from the scope of the invention as defined in the broader claims.

We claim:

1. A method of the class described, consisting in moving galvanized objects in a downward rotary path, surrounding said objects in non-oxidizing gas, heating said gas and constantly utilizing a portion of said gas to convey a non-gaseous, non-oxidizing substance to the heating zone.

2. A method of the class described, consisting in zinc coating objects, feeding them through a hot, non-oxidizing gas zone, while subjecting them to a series of impacts to remove excess zinc, and continuously withdrawing some of the gas to convey vaporizable, non-oxidizing material into said zone to form more gas.

3. In a method of the class described, feeding hot-dipped galvanized objects through a rotary path and subjecting them to impacts, enveloping said path in a hot, non-oxidizing gas of a vaporizable material, and continuously withdrawing a portion of said gas to convey more of said material into said path.

4. The steps of dipping objects in a zinc pot, subjecting the objects to a series of rotations and impacts to remove excess zinc therefrom and simultaneously enveloping said objects in a non-oxidizing gas of sulfur at a temperature from 750 to 1000 degrees F., and then cooling said objects.

5. In a method, as in claim 4, said impacts being caused by said rotations, and simultaneously causing said objects to travel in a downward path.

6. A method, as in claim 2, the gas in said zone being vaporized sulfur and having a temperature from 750 to 1000 degrees F., and said objects being caused to move in a downward path during said impacts, and be discharged into a cooling medium.

7. An apparatus of the class described comprising, the combination with a zinc pot, of a heating chamber, partition means provided with an aperture dividing said chamber into upper and lower compartments, a drum member in the lower compartment, the drum being open at both ends and having perforated walls, the axis of the drum being disposed at an angle to the vertical axis of the chamber, a shaft passing through said drum and chamber and operatively affixed to the drum, means at one end of the shaft to drive the shaft and drum, a blower mechanism having a nozzle associated with the chamber, said nozzle being disposed in the lower compartment, a feed device operatively associated with said blower and delivering a non-oxidizing substance to said nozzle, a burner in said lower compartment adapted to vaporize any of the substance issuing from said nozzle into a gas, a normally closed hopper associated with said lower compartment and adapted to have hot-dipped objects placed therein for movement to said drum, said lower compartment being provided with a discharge outlet having a peripheral portion registering with an end of said drum, said outlet being provided with a normally open closure member, a cooling trough associated with said outlet and adapted to receive articles passing from said drum into said outlet, a second blower, conduit means associated with said second blower and said upper and lower compartment to circulate gas from one compartment to the other through said partition aperture, a second conduit means associated with the first blower and said upper compartment to circulate gas from said upper compartment to said feed device whereby the non-oxidizing gas may be used as a conveying medium for the non-oxidizing substance from said feed device to said nozzle.

8. An apparatus of the class described comprising, a chamber means, a rotatable screen drum therein adapted to receive galvanized objects, means to feed a non-oxidizing gas into said chamber, means to withdraw said gas from said chamber and recirculate it therethrough.

9. In a device for removing excess spelter from hot-dipped galvanized objects, a perforated rotatable means to receive said objects, means to feed a vaporizable non-oxidizing substance to said perforated means, means to vaporize said substance into gaseous state, and means to circulate the gas through said perforated means and to said feeding means whereby said gas conveys more of said substance to said vaporizing means.

10. In combination, a rotating means, a confining chamber therefor, means to feed non-oxidizing gas into the chamber, means to withdraw the gas and return a portion to said chamber and the remainder to said feeding means.

11. A galvanizing apparatus adapted to be used in combination with a zinc pot and water cooling trough, comprising an enclosed chamber, an inclined rotating drum in said chamber, means to receive coated objects from said pot and deliver them to the drum, means to receive the objects from said drum and deliver them to said trough, a blower associated with said chamber, a nozzle associated with said blower and said chamber, means to feed a vaporizable non-oxidizing substance to said blower whereby the substance is blown through said nozzle into the chamber, means to vaporize said substance to a gas in the chamber, and conduit means to lead said gas from said chamber back to said blower whereby said gas is used as a carrier for said substance being fed to said nozzle.

12. An apparatus of the class described comprising a chamber, an inclined perforated rotatable drum in said chamber, a hopper associated with said chamber and opening into one end of said drum, an outlet means having a portion thereof registering with the other end of said drum, normally closed means on said hopper, a closure means on said outlet, and means to continuously circulate a non-oxidizing gas through said chamber.

13. A galvanizing system adapted for use with a zinc pot and cooling trough, comprising a confined chamber, a partition therein provided with an aperture dividing said chamber into upper and lower compartments, an inclined, rotatable, perforated drum in the lower compartment having open ends, a normally closed feed hopper associated with the upper compartment, an outlet means having a closure associated with said lower compartment, said outlet and hopper being disposed at opposite ends of said drum, said upper compartment receiving hot gases from said lower compartment.

14. A system, as in claim 13, said drum being mounted on an inclined shaft, said shaft passing through said hopper and being supported by bearings outside the chamber, and means on the exterior of said chamber to withdraw the hot gases from said hopper compartment and return them to the lower compartment.

15. A system, as in claim 13, said drum being cylindrical in shape, said outlet means having an open end registering with the lower open end of said drum, said outlet having a portion of a less diameter than said first portion and projecting into said cooling trough, and said hopper having an open end registering with the opposite end of said drum.

16. A method of the class described which consists in moving hot-dipped objects in an irregular path and simultaneously surrounding the objects with a vaporized sulfur at a temperature of 750 to 1000 degrees F.

17. A system adapted to remove excess spelter from galvanized objects comprising, a chamber provided with a compartment connected therewith, means in said chamber to subject galvanized objects to a series of impacts to remove excess spelter, a blower discharging into said chamber means to supply solid vaporizable, non-oxidizing material to said blower, the latter thereby blowing said material into said chamber, means to gasify said material thereby enveloping the impact producing means in a non-oxidizing atmosphere, means to withdraw said gas into said compartment and blow a portion of said gas back into said chamber, said first mentioned blower withdrawing the remainder of said gas from said compartment and delivering it as a carrier stream to the material supply means.

Signed at Garwood, in the county of Union and State of New Jersey, this eighth day of August, A. D. 1928.

HENRY B. NEWHALL.
HENRY W. PLEISTER.
CHARLES A. GIBLIN.